United States Patent
Moon et al.

(10) Patent No.: US 9,641,227 B2
(45) Date of Patent: May 2, 2017

(54) TRANSCEIVERS FOR NEAR FIELD COMMUNICATION, NEAR FIELD COMMUNICATION DEVICES, AND ELECTRONIC SYSTEMS HAVING THE SAME

(71) Applicants: Byeong-Taek Moon, Seoul (KR); Il-Jong Song, Suwon-si (KR)

(72) Inventors: Byeong-Taek Moon, Seoul (KR); Il-Jong Song, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 14/638,910

(22) Filed: Mar. 4, 2015

(65) Prior Publication Data

US 2015/0365139 A1 Dec. 17, 2015

(30) Foreign Application Priority Data

Jun. 13, 2014 (KR) .................. 10-2014-0072214

(51) Int. Cl.
*H04B 5/02* (2006.01)
*H04B 5/00* (2006.01)

(52) U.S. Cl.
CPC .............. *H04B 5/02* (2013.01); *H04B 5/0031* (2013.01); *H04B 5/0056* (2013.01)

(58) Field of Classification Search
USPC ........................................ 455/41.1
See application file for complete search history.

(56) References Cited

U.S. PATENT DOCUMENTS

| 7,400,865 B2 | 7/2008 | Jarvinen |
| 7,505,743 B2 | 3/2009 | Kim et al. |
| 7,768,792 B2 | 8/2010 | Kim et al. |
| 8,368,515 B2 | 2/2013 | Kim |

(Continued)

FOREIGN PATENT DOCUMENTS

| JP | 2005-182614 A | 7/2005 |
| JP | 4264534 B2 | 5/2009 |

(Continued)

*Primary Examiner* — Edward Urban
*Assistant Examiner* — Ralph H Justus
(74) *Attorney, Agent, or Firm* — Harness, Dickey & Pierce, PLLC.

(57) ABSTRACT

A transceiver for near field communication may include: a resonance circuit coupled between a first node and a second node, the resonance circuit having a resonance frequency and being configured to emit an electromagnetic wave to communicate data with an external device; a first capacitor coupled between the first node and a third node; a second capacitor coupled between the second node and a fourth node; and/or a filter coupled among a first transmission electrode, a second transmission electrode, the third node, and the fourth node in an asymmetrical structure to provide a first frequency response and a second frequency response to the first transmission electrode and the second transmission electrode, respectively, the first frequency response being different from the second frequency response, the filter being configured to receive the data through the first transmission electrode and the second transmission electrode.

20 Claims, 9 Drawing Sheets

(56) References Cited

U.S. PATENT DOCUMENTS

| | | | | |
|---|---|---|---|---|
| 8,736,495 | B2* | 5/2014 | Cho | G06K 19/0723 |
| | | | | 343/702 |
| 9,026,050 | B2* | 5/2015 | Ikeda | H01Q 7/00 |
| | | | | 455/107 |
| 9,124,355 | B2* | 9/2015 | Black | H04B 1/525 |
| 2007/0236851 | A1* | 10/2007 | Shameli | G06K 19/0701 |
| | | | | 361/113 |
| 2010/0321128 | A1 | 12/2010 | Merlin | |
| 2011/0053500 | A1* | 3/2011 | Menegoli | H04B 5/0037 |
| | | | | 455/41.1 |
| 2012/0212305 | A1* | 8/2012 | Shafer | H03H 7/0153 |
| | | | | 333/174 |
| 2012/0235766 | A1* | 9/2012 | Krems | H03H 9/725 |
| | | | | 333/133 |
| 2013/0027078 | A1* | 1/2013 | Nakano | H04B 5/0037 |
| | | | | 324/764.01 |
| 2013/0178154 | A1* | 7/2013 | Zhu | H04M 1/7253 |
| | | | | 455/41.1 |
| 2014/0368294 | A1* | 12/2014 | Ju | H01P 5/16 |
| | | | | 333/125 |
| 2015/0244179 | A1* | 8/2015 | Ritter | H02J 5/005 |
| | | | | 307/104 |
| 2015/0263406 | A1* | 9/2015 | Ohashi | H01P 5/187 |
| | | | | 333/110 |
| 2015/0303997 | A1* | 10/2015 | Dhayni | G06K 7/10128 |
| | | | | 340/10.1 |

FOREIGN PATENT DOCUMENTS

| | | |
|---|---|---|
| KR | 2007-0068104 A | 6/2007 |
| KR | 2011-0090392 A | 8/2011 |

* cited by examiner

TRANSCEIVERS FOR NEAR FIELD COMMUNICATION, NEAR FIELD COMMUNICATION DEVICES, AND ELECTRONIC SYSTEMS HAVING THE SAME

CROSS-REFERENCE TO RELATED APPLICATION(S)

This application claims priority from Korean Patent Application No. 10-2014-0072214, filed on Jun. 13, 2014, in the Korean Intellectual Property Office (KIPO), the entire contents of which are incorporated herein by reference.

BACKGROUND

1. Field

Some example embodiments may relate generally to wireless communication technologies. Some example embodiments may relate generally to transceivers for near field communication (NFC), NFC devices including the transceivers, and/or electronic systems including the NFC devices.

2. Description of Related Art

Near field communication (NFC) technology may be a short-range, wireless communication technology. As NFC technology has been developed, NFC devices may have been more commonly employed in mobile devices.

When included in a mobile device, an NFC device may consume power of the mobile device, which may typically be provided via a battery of the mobile device.

Therefore, it may be important to reduce power loss while the NFC device transmits an output signal.

SUMMARY

Some example embodiments may provide transceivers for near field communication (NFC) that reduce power loss.

Some example embodiments may provide NFC devices including the transceivers.

Some example embodiments may provide electronic systems including the NFC devices.

In some example embodiments, a transceiver for near field communication (NFC) may comprise: a resonance circuit coupled between a first node and a second node, the resonance circuit having a resonance frequency and being configured to emit an electromagnetic wave to communicate data with an external device; a first capacitor coupled between the first node and a third node; a second capacitor coupled between the second node and a fourth node; and/or a filter coupled among a first transmission electrode, a second transmission electrode, the third node, and the fourth node in an asymmetrical structure to provide a first frequency response and a second frequency response to the first transmission electrode and the second transmission electrode, respectively, the first frequency response being different from the second frequency response, the filter being configured to receive the data through the first transmission electrode and the second transmission electrode.

In some example embodiments, a cutoff frequency of the filter at the first transmission electrode and a cutoff frequency of the filter at the second transmission electrode may correspond to two times the resonance frequency.

In some example embodiments, a cutoff frequency of the filter at the first transmission electrode and a cutoff frequency of the filter at the second transmission electrode may be greater than one and a half times the resonance frequency and less than two times the resonance frequency.

In some example embodiments, a reactance between the first transmission electrode and the second transmission electrode may be zero ohms.

In some example embodiments, the filter may be configured to perform a low-pass filtering operation.

In some example embodiments, the filter may comprise at least one capacitor and at least one inductor.

In some example embodiments, the filter may comprise: a third capacitor coupled between the third node and the fourth node; and/or a fourth capacitor coupled between the fourth node and a ground voltage.

In some example embodiments, the filter may further comprise: a first inductor coupled between the third node and the first transmission electrode; and/or a second inductor coupled between the fourth node and the second transmission electrode.

In some example embodiments, an inductance of the first inductor may be greater than an inductance of the second inductor.

In some example embodiments, an inductance of the first inductor may be greater than two times an inductance of the second inductor.

In some example embodiments, a cutoff frequency of the filter at the first transmission electrode may be determined based on a capacitance of the fourth capacitor and an inductance of the second inductor.

In some example embodiments, a reactance between the first transmission electrode and the second transmission electrode may be determined based on a capacitance of the third capacitor, an inductance of the first inductor, and an inductance of the second inductor.

In some example embodiments, a capacitance of the first capacitor may be substantially the same as a capacitance of the second capacitor.

In some example embodiments, the resonance circuit may comprise: an antenna coupled between the first node and the second node; and/or a resonance capacitor coupled between the first node and the second node.

In some example embodiments, a near field communication (NFC) device may comprise: an NFC chip configured to generate a transmission signal and to output the transmission signal through a first transmission electrode and a second transmission electrode; and/or a transceiver coupled between the first transmission electrode and the second transmission electrode in an asymmetrical structure, the transceiver being configured to emit an electromagnetic wave based on the transmission signal provided by the NFC chip through the first transmission electrode and the second transmission electrode.

In some example embodiments, a reactance provided by the transceiver between the first transmission electrode and the second transmission electrode may be zero ohms.

In some example embodiments, the transceiver may comprise: a resonance circuit coupled between a first node and a second node, the resonance circuit having a resonance frequency substantially equal to a frequency of the transmission signal; a first capacitor coupled between the first node and a third node; a second capacitor coupled between the second node and a fourth node; and/or a filter coupled among the first transmission electrode, the second transmission electrode, the third node, and the fourth node in the asymmetrical structure to provide a first frequency response and a second frequency response to the first transmission electrode and the second transmission electrode, respectively, the first frequency response being different from the second frequency response.

In some example embodiments, a cutoff frequency of the filter at the first transmission electrode and a cutoff frequency of the filter at the second transmission electrode may correspond to two times the frequency of the transmission signal.

In some example embodiments, a cutoff frequency of the filter at the first transmission electrode and a cutoff frequency of the filter at the second transmission electrode may be greater than one and a half times the frequency of the transmission signal and less than two times the frequency of the transmission signal.

In some example embodiments, the filter may comprise: a third capacitor coupled between the third node and the fourth node; and/or a fourth capacitor coupled between the fourth node and a ground voltage.

In some example embodiments, the filter may further comprise: a first inductor coupled between the third node and the first transmission electrode; and/or a second inductor coupled between the fourth node and the second transmission electrode.

In some example embodiments, an inductance of the first inductor may be greater than an inductance of the second inductor.

In some example embodiments, an inductance of the first inductor may be greater than two times an inductance of the second inductor.

In some example embodiments, the transceiver may further comprise: a resistor coupled between the first node and a fifth node; and/or a third capacitor coupled between the fifth node and a reception electrode. The NFC chip may generate input data by demodulating a signal provided by the transceiver through the reception electrode.

In some example embodiments, an electronic system may comprise: a near field communication (NFC) device configured to communicate with an external device through NFC; a memory device configured to store output data; and/or an application processor configured to control operations of the NFC device and the memory device. The NFC device may comprise: an NFC chip configured to generate a transmission signal corresponding to the output data and to output the transmission signal through a first transmission electrode and a second transmission electrode; and/or a transceiver coupled between the first transmission electrode and the second transmission electrode in an asymmetrical structure to provide a first frequency response and a second frequency response to the first transmission electrode and the second transmission electrode, respectively, the first frequency response being different from the second frequency response, the transceiver being configured to emit an electromagnetic wave based on the transmission signal provided by the NFC chip through the first transmission electrode and the second transmission electrode.

In some example embodiments, a transceiver for near field communication (NFC) may comprise: a first capacitor; a second capacitor; a first transmission electrode; a second transmission electrode; a circuit, configured to emit an electromagnetic wave to communicate data to an external device, electrically connected to a first terminal of the first capacitor and a first terminal of the second capacitor; and/or a filter electrically connected to a second terminal of the first capacitor, a second terminal of the second capacitor, the first transmission electrode, and the second transmission electrode in an asymmetrical structure to provide a first frequency response to the first transmission electrode and a second frequency response to the second transmission electrode. The first frequency response may be different from the second frequency response. The filter may be configured to receive the data through the first and second transmission electrodes.

In some example embodiments, the filter may be configured to perform a low-pass filtering operation.

In some example embodiments, the filter may comprise: a third capacitor. A first terminal of the third capacitor may be electrically connected to the second terminal of the first capacitor. A second terminal of the third capacitor may be electrically connected to the second terminal of the second capacitor.

In some example embodiments, the filter may further comprise: a fourth capacitor. A first terminal of the fourth capacitor may be electrically connected to the second terminal of the second capacitor and the second terminal of the third capacitor. A second terminal of the fourth capacitor may be electrically connected to a ground voltage.

In some example embodiments, the filter may comprise: a third capacitor. A first terminal of the third capacitor may be electrically connected to the first transmission electrode. A second terminal of the third capacitor may be electrically connected to the second transmission electrode.

In some example embodiments, the filter may further comprise: a fourth capacitor. A first terminal of the fourth capacitor may be electrically connected to the second terminal of the third capacitor and the second transmission electrode. A second terminal of the fourth capacitor may be electrically connected to a ground voltage.

BRIEF DESCRIPTION OF THE DRAWINGS

The above and/or other aspects and advantages will become more apparent and more readily appreciated from the following detailed description of example embodiments, taken in conjunction with the accompanying drawings, in which.

DETAILED DESCRIPTION OF THE EMBODIMENTS

Figure 1:
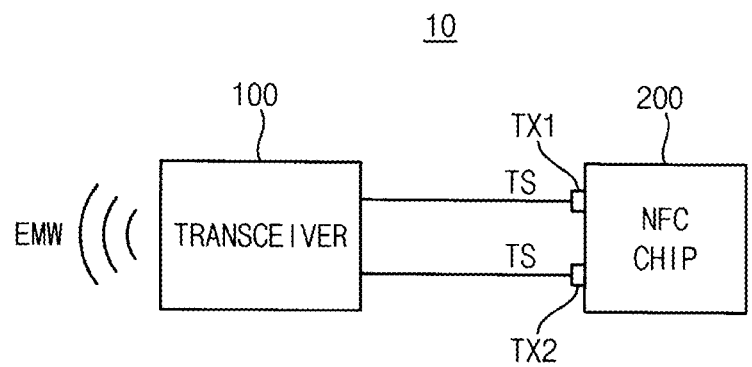
FIG. 1 is a block diagram illustrating a near field communication (NFC) device according to some example embodiments.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Example embodiments may be described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will typically have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature, their shapes are not intended to illustrate the actual shape of a region of a device, and their shapes are not intended to limit the scope of the example embodiments.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

FIG. 1 is a block diagram illustrating a near field communication (NFC) device according to some example embodiments.

An NFC device 10 illustrated in FIG. 1 communicates with an external device through an NFC scheme.

In some example embodiments, the NFC device 10 may perform an operation of detecting whether an NFC card is near the NFC device 10, and alternately, an operation of detecting whether an NFC reader is near the NFC device 10.

When the NFC device 10 detects an NFC reader near the NFC device 10, the NFC device 10 may operate in a card mode, in which the NFC device 10 operates as a card. In the card mode, the NFC device 10 may communicate data (e.g., transmit and receive data) with the NFC reader using an electromagnetic wave EMW emitted from the NFC reader.

When the NFC device 10 detects an NFC card near the NFC device 10, the NFC device 10 may operate in a reader mode, in which the NFC device 10 operates as a reader. In the reader mode, the NFC device 10 may emit an electromagnetic wave EMW to communicate data with the NFC card.

In some example embodiments, a frequency of the electromagnetic wave EMW may be about 13.56 megahertz (MHz).

Referring to FIG. 1, the NFC device 10 includes a transceiver 100 and an NFC chip 200.

The transceiver 100 is coupled to the NFC chip 200 through a first transmission electrode TX1 and a second transmission electrode TX2.

In the reader mode, the NFC chip 200 generates a transmission signal TS corresponding to output data and outputs the transmission signal TS through the first transmission electrode TX1 and the second transmission electrode TX2. In some example embodiments, the transmission signal TS may be a differential signal.

In some example embodiments, a frequency of the transmission signal TS may be about 13.56 MHz.

The transceiver 100 emits the electromagnetic wave EMW corresponding to the transmission signal TS provided by the NFC chip 200 through the first transmission electrode TX1 and the second transmission electrode TX2.

The transceiver 100 is coupled between the first transmission electrode TX1 and the second transmission electrode TX2 in an asymmetrical structure. Therefore, a frequency response of the transceiver 100 at the first transmission electrode TX1 is different from a frequency response of the transceiver 100 at the second transmission electrode TX2.

However, as will be described later, at a frequency of about 13.56 MHz, which is used in the NFC scheme, a magnitude of the frequency response of the transceiver 100 at the first transmission electrode TX1 may be substantially the same as a magnitude of the frequency response of the transceiver 100 at the second transmission electrode TX2. Since the frequency of the transmission signal TS is about 13.56 MHz, the NFC device 10 may be able to communicate the transmission signal TS normally although the transceiver 100 is coupled between the first transmission electrode TX1 and the second transmission electrode TX2 in the asymmetrical structure.

Figure 2:
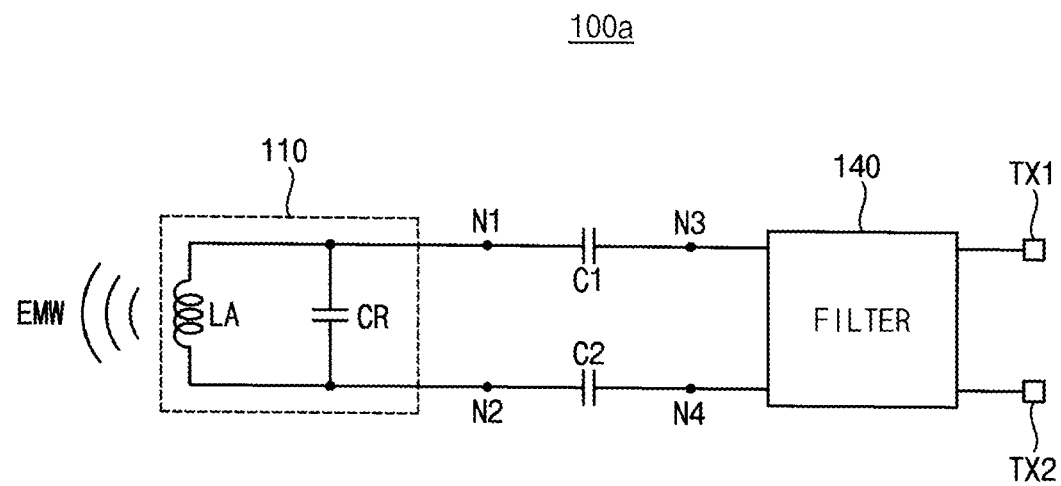
FIG. 2 is a block diagram illustrating an example of a transceiver included in the NFC device of FIG. 1.

FIG. 2 is a block diagram illustrating an example of a transceiver included in the NFC device of FIG. 1.

Referring to FIG. 2, a transceiver 100a may include a resonance circuit 110, a first capacitor C1, a second capacitor C2, and a filter 140.

The resonance circuit 110 may be coupled between a first node N1 and a second node N2. The resonance circuit 110 may include an antenna LA and a resonance capacitor CR that are coupled in parallel between the first node N1 and the second node N2.

In some example embodiments, the antenna LA may include a loop antenna.

A resonance frequency of the resonance circuit 110 may be substantially the same as the frequency of the transmission signal TS. For example, the resonance frequency of the resonance circuit 110 may be about 13.56 MHz.

The first capacitor C1 may be coupled between the first node N1 and a third node N3.

The second capacitor C2 may be coupled between the second node N2 and a fourth node N4.

In some example embodiments, a capacitance of the first capacitor C1 may be substantially the same as a capacitance of the second capacitor C2.

The filter 140 may be coupled among the first transmission electrode TX1, the second transmission electrode TX2, the third node N3, and the fourth node N4 in an asymmetrical structure, such that the filter 140 may provide a first frequency response to the first transmission electrode TX1 and provide a second frequency response, which is different from the first frequency response, to the second transmission electrode TX2.

In some example embodiments, the filter 140 may include at least one capacitor and at least one inductor.

Figure 3:
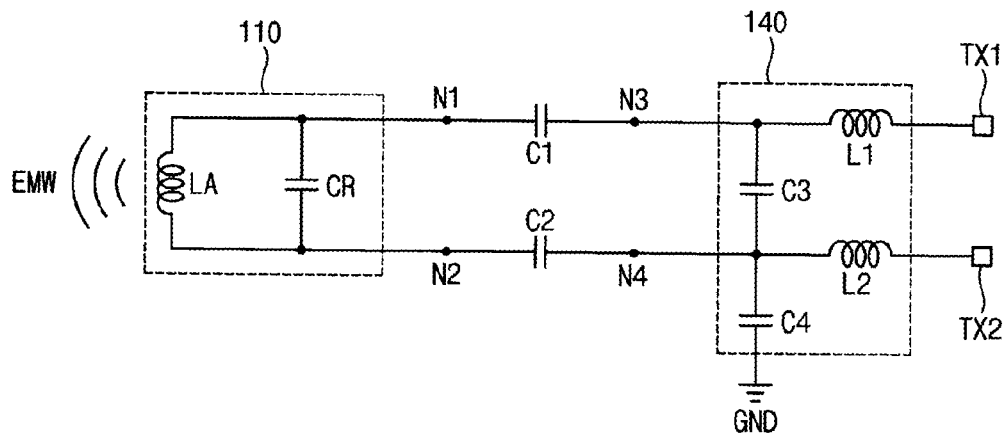
FIG. 3 is a circuit diagram illustrating an example of a filter included in the transceiver of FIG. 2.

FIG. 3 is a circuit diagram illustrating an example of a filter included in the transceiver of FIG. 2.

Referring to FIG. 3, the filter 140 may include a third capacitor C3, a fourth capacitor C4, a first inductor L1, and a second inductor L2.

The third capacitor C3 may be coupled between the third node N3 and the fourth node N4.

The fourth capacitor C4 may be coupled between the fourth node N4 and a ground voltage GND.

The first inductor L1 may be coupled between the third node N3 and the first transmission electrode TX1.

The second inductor L2 may be coupled between the fourth node N4 and the second transmission electrode TX2.

In some example embodiments, an inductance of the first inductor L1 may be greater than an inductance of the second inductor L2. For example, the inductance of the first inductor L1 may be greater than two times the inductance of the second inductor L2.

As illustrated in FIG. 3, the filter 140 may include the fourth capacitor C4 coupled between the fourth node N4 and the ground voltage GND in addition to the third capacitor C3 coupled between the third node N3 and the fourth node N4. Therefore, the filter 140 may be coupled among the first transmission electrode TX1, the second transmission electrode TX2, the third node N3, and the fourth node N4 in the asymmetrical structure. As such, the filter 140 may provide different frequency responses at the first transmission electrode TX1 and at the second transmission electrode TX2.

In some example embodiments, the filter 140 may have characteristics of a low pass filter at each of the first transmission electrode TX1 and the second transmission electrode TX2. Therefore, the filter 140 may perform a low pass filtering operation on the transmission signal TS.

Figure 4:
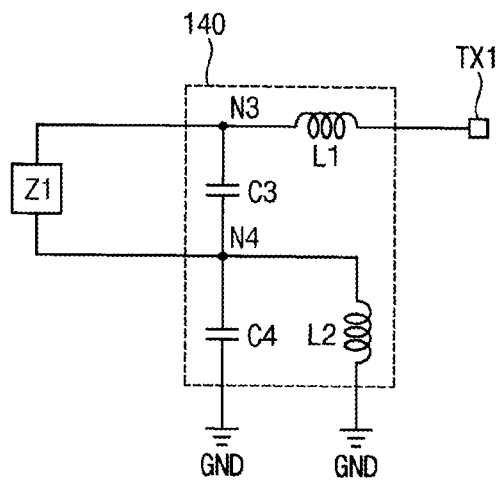
FIG. 4 is a circuit diagram for describing a frequency response of the filter included in the transceiver of FIG. 3 at a first transmission electrode.
Figure 5:
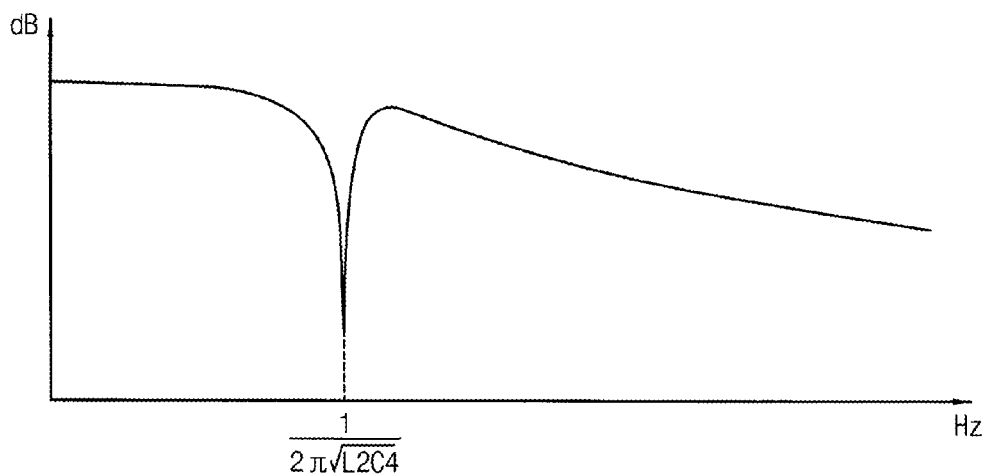
FIG. 5 is a graph illustrating a frequency response of the filter included in the transceiver of FIG. 3 at a first transmission electrode.

FIG. 4 is a circuit diagram for describing a frequency response of the filter included in the transceiver of FIG. 3 at a first transmission electrode. FIG. 5 is a graph illustrating a frequency response of the filter included in the transceiver of FIG. 3 at a first transmission electrode.

FIG. 4 illustrates an equivalent circuit of the transceiver 100a of FIG. 3 in the case that the second transmission electrode TX2 is coupled to the ground voltage GND.

In FIG. 4, a first impedance Z1 represents an equivalent impedance of the resonance circuit 110, the first capacitor C1, and the second capacitor C2 seen from the third node N3 and the fourth node N4, which correspond to output electrodes of the filter 140.

As illustrated in FIG. 4, the second transmission electrode TX2 may be coupled to the ground voltage GND to determine a frequency response of the filter 140 at the first transmission electrode TX1.

Referring to FIG. 4, when a frequency of a signal provided through the first transmission electrode TX1 is zero Hertz (Hz), a reactance of the first inductor L1 and a reactance of the second inductor L2 may be zero ohms, and a reactance of the third capacitor C3 and a reactance of the fourth capacitor C4 may be infinity ohms, such that a magnitude of the signal transferred to the first impedance Z1 may be maximized.

When a frequency of a signal provided through the first transmission electrode TX1 is infinity Hz, the reactance of the first inductor L1 and the reactance of the second inductor L2 may be infinity ohms, and the reactance of the third capacitor C3 and the reactance of the fourth capacitor C4 may be zero ohms, such that a magnitude of the signal transferred to the first impedance Z1 may be minimized.

In addition, since the second inductor L2 and the fourth capacitor C4 are coupled in parallel between the fourth node N4 and the ground voltage GND, a resonance frequency of a combination of the second inductor L2 and the fourth capacitor C4 may correspond to $1/(2\pi\sqrt{L2C4})$, which will be referred to as a first frequency.

Therefore, when a frequency of a signal provided through the first transmission electrode TX1 corresponds to the first frequency, a combined impedance of the second inductor L2 and the fourth capacitor C4 may be infinity, such that a magnitude of the signal transferred to the first impedance Z1 may be minimized.

Therefore, the filter 140 may have a frequency response of FIG. 5 at the first transmission electrode TX1.

In FIG. 5, the x-axis represents frequency (in MHz), and the y-axis represents a magnitude of the frequency response (in decibels (dB)).

As illustrated in FIG. 5, the filter 140 may have characteristics of a low pass filter at the first transmission electrode TX1.

Referring to FIGS. 4 and 5, as a frequency of a signal provided through the first transmission electrode TX1 approaches the first frequency in a frequency range around the first frequency, a magnitude of the frequency response of the filter 140 at the first transmission electrode TX1 may sharply decrease. When a frequency of a signal provided through the first transmission electrode TX1 equals to the first frequency, the magnitude of the frequency response of the filter 140 at the first transmission electrode TX1 may be minimized. Therefore, a cutoff frequency of the filter 140 at the first transmission electrode TX1 may be slightly smaller than the first frequency.

That is, the cutoff frequency of the filter 140 at the first transmission electrode TX1 may be determined based on a capacitance of the fourth capacitor C4 and an inductance of the second inductor L2. An effect of a capacitance of the third capacitor C3 and an inductance of the first inductor L1 on the cutoff frequency of the filter 140 at the first transmission electrode TX1 may be negligible.

Therefore, when the inductance of the first inductor L1 and the inductance of the second inductor L2 are determined, the cutoff frequency of the filter 140 at the first transmission electrode TX1 may be set by adjusting the capacitance of the fourth capacitor C4.

Figure 6:
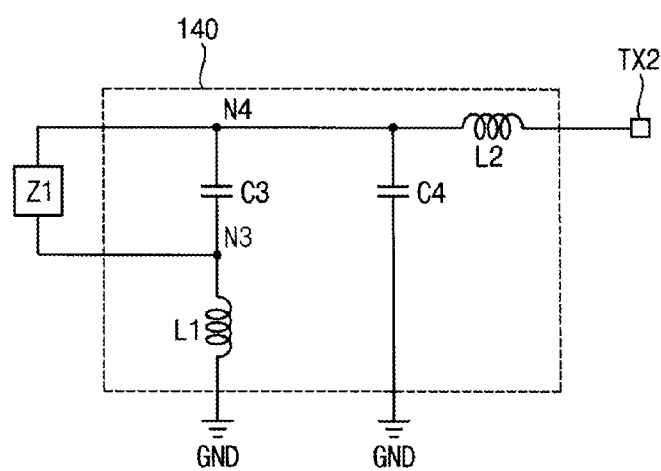
FIG. 6 is a circuit diagram for describing a frequency response of the filter included in the transceiver of FIG. 3 at a second transmission electrode.
Figure 7:
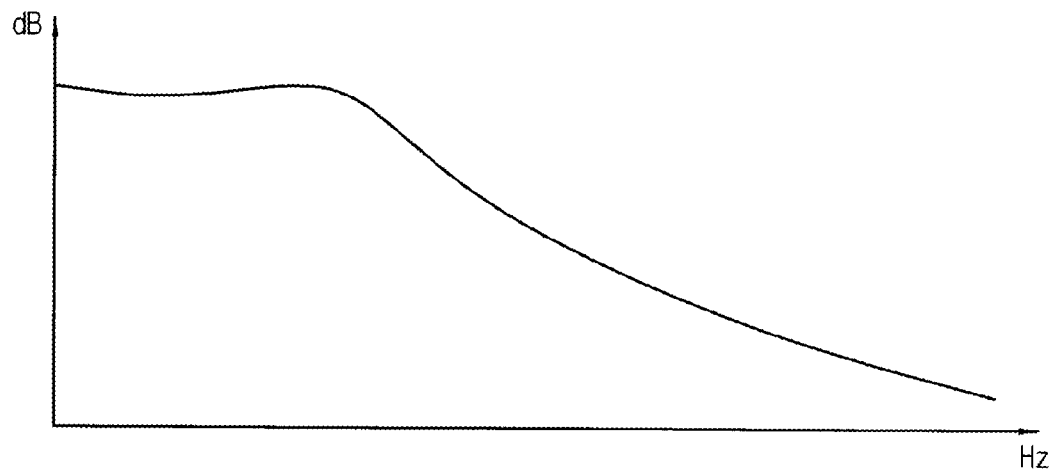
FIG. 7 is a graph illustrating a frequency response of the filter included in the transceiver of FIG. 3 at a second transmission electrode.

FIG. 6 is a circuit diagram for describing a frequency response of the filter included in the transceiver of FIG. 3 at a second transmission electrode. FIG. 7 is a graph illustrating a frequency response of the filter included in the transceiver of FIG. 3 at a second transmission electrode.

FIG. 6 illustrates an equivalent circuit of the transceiver 100a of FIG. 3 in the case that the first transmission electrode TX1 is coupled to the ground voltage GND.

In FIG. 6, the first impedance Z1 represents an equivalent impedance of the resonance circuit 110, the first capacitor C1, and the second capacitor C2 seen from the third node N3 and the fourth node N4, which correspond to the output electrodes of the filter 140.

As illustrated in FIG. 6, the first transmission electrode TX1 may be coupled to the ground voltage GND to determine a frequency response of the filter 140 at the second transmission electrode TX2.

Referring to FIG. 6, when a frequency of a signal provided through the second transmission electrode TX2 is zero Hz, the reactance of the first inductor L1 and the reactance of the second inductor L2 may be zero ohms, and the reactance of the third capacitor C3 and the reactance of the fourth capacitor C4 may be infinity ohms, such that a magnitude of the signal transferred to the first impedance Z1 may be maximized.

When a frequency of a signal provided through the second transmission electrode TX2 is infinity Hz, the reactance of the first inductor L1 and the reactance of the second inductor L2 may be infinity ohms, and the reactance of the third capacitor C3 and the reactance of the fourth capacitor C4 may be zero ohms, such that a magnitude of the signal transferred to the first impedance Z1 may be minimized.

Therefore, the filter 140 may have a frequency response of FIG. 7 at the second transmission electrode TX2.

In FIG. 7, the x-axis represents frequency (in MHz), and the y-axis represents a magnitude of the frequency response (in dB).

As illustrated in FIG. 7, the filter 140 may have characteristics of a low pass filter at the second transmission electrode TX2.

Referring to FIG. 6, as the inductance of the first inductor L1 is greater than the inductance of the second inductor L2, a dependence of a cutoff frequency of the filter 140 at the second transmission electrode TX2 on the capacitance of the fourth capacitor C4 and the inductance of the second inductor L2 may increase. In addition, as the inductance of the first inductor L1 increases, a magnitude of the frequency response of the filter 140 at the second transmission electrode TX2 may more sharply decrease in a frequency range greater than the cutoff frequency. Therefore, as the inductance of the first inductor L1 increases, a performance of the filter 140 may increase.

Therefore, the inductance of the first inductor L1 may be set to be greater than the inductance of the second inductor L2. For example, the inductance of the first inductor L1 may be greater than two times of the inductance of the second inductor L2. In this case, the cutoff frequency of the filter 140 at the second transmission electrode TX2 may be determined based on the capacitance of the fourth capacitor C4 and the inductance of the second inductor L2. That is, the cutoff frequency of the filter 140 at the second transmission electrode TX2 may be similar to the first frequency.

As described above with reference to FIGS. 4 to 7, the filter 140 may have characteristics of a low pass filter at each of the first transmission electrode TX1 and the second transmission electrode TX2. In addition, when the inductance of the first inductor L1 and the inductance of the second inductor L2 are determined such that the inductance of the first inductor L1 is greater than the inductance of the second inductor L2, the cutoff frequency of the filter 140 at the first transmission electrode TX1 and the cutoff frequency of the filter 140 at the second transmission electrode TX2 may be set by adjusting the capacitance of the fourth capacitor C4.

The transmission signal TS provided by the NFC chip 200 through the first transmission electrode TX1 and the second transmission electrode TX2 may include harmonics except for a signal component having a frequency substantially the same as the resonance frequency of the resonance circuit 110.

Since the filter 140 has characteristics of a low pass filter at each of the first transmission electrode TX1 and the second transmission electrode TX2, the filter 140 may eliminate the harmonics from the transmission signal TS by performing a low pass filtering operation on the transmission signal TS.

The cutoff frequency of the filter 140 at the first transmission electrode TX1 and the cutoff frequency of the filter 140 at the second transmission electrode TX2 may be greater than the resonance frequency of the resonance circuit 110 and be equal to or smaller than two times of the resonance frequency of the resonance circuit 110, such that the filter 140 may eliminate the harmonics from the transmission signal TS.

However, while the transmission signal TS passes through the filter 140, a portion of the signal component, which has a frequency substantially the same as the resonance frequency of the resonance circuit 110, may be also eliminated. Therefore, power loss may occur at the resonance frequency of the resonance circuit 110 because of the insertion of the filter 140. In addition, as the cutoff frequency of the filter 140 approaches the resonance frequency of the resonance circuit 110, larger portion of the signal component may be eliminated by the filter 140 such that the power loss may increase.

Therefore, the inductance of the first inductor L1, the inductance of the second inductor L2, the capacitance of the third capacitor C3, and the capacitance of the fourth capacitor C4 may be determined such that the cutoff frequency of the filter 140 at the first transmission electrode TX1 and the cutoff frequency of the filter 140 at the second transmission electrode TX2 may be close to two times of the resonance frequency of the resonance circuit 110, which is about 27.12 MHz. For example, as described above with reference to FIGS. 4 to 7, after the inductance of the first inductor L1 and the inductance of the second inductor L2 are determined such that the inductance of the first inductor L1 is greater than the inductance of the second inductor L2, the capacitance of the fourth capacitor C4 may be determined such that the cutoff frequency of the filter 140 at the first transmission electrode TX1 and the cutoff frequency of the filter 140 at the second transmission electrode TX2 may be close to two times of the resonance frequency of the resonance circuit 110.

In some example embodiments, the cutoff frequency of the filter 140 at the first transmission electrode TX1 and the cutoff frequency of the filter 140 at the second transmission electrode TX2 may correspond to two times of the resonance frequency of the resonance circuit 110. In this case, the filter 140 may minimize the power loss at the resonance frequency of the resonance circuit 110 while effectively eliminating the harmonics included in the transmission signal TS.

In some example embodiments, the cutoff frequency of the filter 140 at the first transmission electrode TX1 and the cutoff frequency of the filter 140 at the second transmission electrode TX2 may be greater than one and a half times of the resonance frequency of the resonance circuit 110 and smaller than two times of the resonance frequency of the resonance circuit 110. In this case, the filter 140 may be easily manufactured while effectively decreasing the power loss at the resonance frequency of the resonance circuit 110 and eliminating the harmonics included in the transmission signal TS.

In addition, the filter 140 may perform an impedance matching between the resonance circuit 110 and the first and second transmission electrodes TX1 and TX2, such that a reactance of the transceiver 100a between the first transmission electrode TX1 and the second transmission electrode TX2 may be zero ohms.

When the reactance of the transceiver 100a between the first transmission electrode TX1 and the second transmission electrode TX2 is zero ohms, power transferred to the resonance circuit 110 may be maximized.

Therefore, the inductance of the first inductor L1, the inductance of the second inductor L2, the capacitance of the third capacitor C3, and the capacitance of the fourth capacitor C4 may be determined such that the reactance of the transceiver 100a between the first transmission electrode TX1 and the second transmission electrode TX2 may be zero ohms.

Referring to FIG. 3, since the fourth capacitor C4 is not included in a loop including the first transmission electrode TX1, the second transmission electrode TX2, and the resonance circuit 110, the fourth capacitor C4 may not have an influence on an impedance of the transceiver 100a between the first transmission electrode TX1 and the second transmission electrode TX2.

Therefore, the reactance of the transceiver 100a between the first transmission electrode TX1 and the second transmission electrode TX2 may be determined based on the inductance of the first inductor L1, the inductance of the second inductor L2, and the capacitance of the third capacitor C3.

When the inductance of the first inductor L1 and the inductance of the second inductor L2 are determined, the reactance of the transceiver 100a between the first transmission electrode TX1 and the second transmission electrode TX2 may be set to zero ohms by adjusting the capacitance of the third capacitor C3.

Generally, a transceiver of an NFC device includes a filter coupled to an NFC chip for an elimination of harmonics and an impedance matching. The filter included in a general transceiver is coupled to transmission electrodes of the NFC chip in a symmetrical structure. Therefore, capacitors and inductors included in the filter may have an influence on both the impedance matching and the cutoff frequency. As such, it is difficult to set a reactance of the transceiver to be zero ohms while setting a cutoff frequency of the filter close to two times a resonance frequency, which is about 27.12 MHz. For this reason, the cutoff frequency of the filter included in a general NFC device is normally between 15 MHz and 16 MHz, which is close to the resonance frequency. Since the cutoff frequency is close to the resonance frequency, a large portion of a signal component, which has a frequency substantially the same as the resonance frequency, may be eliminated by the filter. Therefore, power loss, which occurs while a signal is transferred from the NFC chip to the antenna, is relatively large.

As described above with reference to FIGS. 1 to 7, the transceiver 100 according to some example embodiments may include the filter 140 coupled between the first transmission electrode TX1 and the second transmission electrode TX2 in an asymmetrical structure, such that the filter 140 may provide a first frequency response to the first transmission electrode TX1 and provide a second frequency response, which is different from the first frequency response, to the second transmission electrode TX2.

Since the fourth capacitor C4 is not included in the loop including the first transmission electrode TX1, the second transmission electrode TX2, and the resonance circuit 110, the fourth capacitor C4 may not have an influence on the impedance of the transceiver 100a between the first transmission electrode TX1 and the second transmission electrode TX2.

In addition, when the inductance of the first inductor L1 is greater than the inductance of the second inductor L2, the cutoff frequency of the filter 140 at the first transmission electrode TX1 and the cutoff frequency of the filter 140 at the second transmission electrode TX2 may be mainly dependent on the capacitance of the fourth capacitor C4.

Therefore, after the inductance of the first inductor L1 and the inductance of the second inductor L2 are determined such that the inductance of the first inductor L1 is greater than the inductance of the second inductor L2, the capacitance of the third capacitor C3 may be determined such that the reactance of the transceiver 100a between the first transmission electrode TX1 and the second transmission electrode TX2 may be zero ohms, and the capacitance of the fourth capacitor C4 may be determined such that the cutoff frequency of the filter 140 at the first transmission electrode TX1 and the cutoff frequency of the filter 140 at the second transmission electrode TX2 may be close to two times of the resonance frequency of the resonance circuit 110, which is about 27.12 MHz.

Since the reactance of the transceiver 100 between the first transmission electrode TX1 and the second transmission electrode TX2 is zero ohms and the cutoff frequency of the filter 140 is close to two times of the resonance frequency of the resonance circuit 110, the transceiver 100 may effectively decrease power loss occurring while the transmission signal TS is transferred from the NFC chip 200 to the resonance circuit 110. Therefore, an output power of transceiver 100 may effectively increase.

Figure 8:
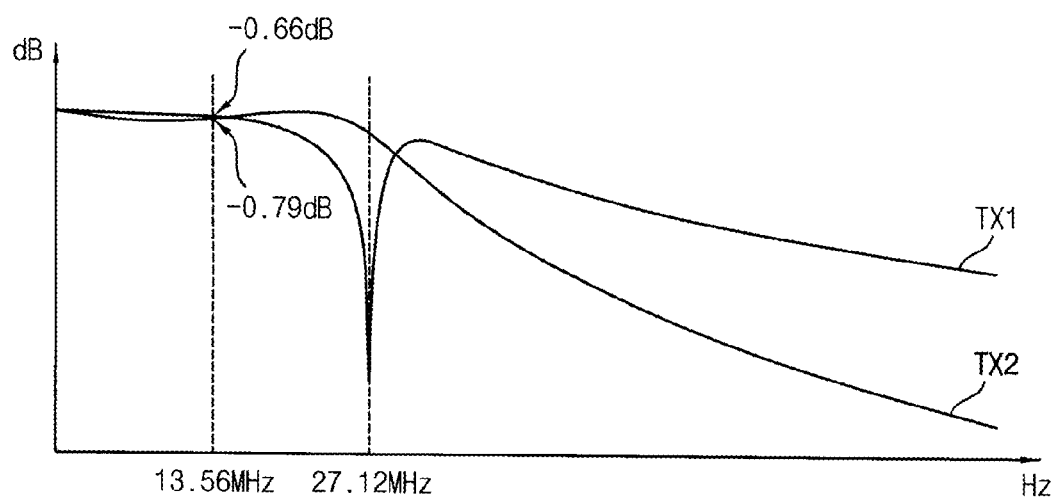
FIG. 8 is a graph illustrating a simulation result of frequency responses of the filter included in the transceiver of FIG. 3 at a first transmission electrode and at a second transmission electrode.

FIG. 8 is a graph illustrating a simulation result of frequency responses of the filter included in the transceiver of FIG. 3 at a first transmission electrode and at a second transmission electrode. In FIG. 8, the x-axis represents frequency (in MHz), and the y-axis represents a magnitude of the frequency response (in decibels (dB)).

FIG. 8 represents a simulation results of the frequency responses of the filter 140 when the first frequency, that is, $1/(2\sqrt{L2C4})$ is set to be two times of the resonance frequency of the resonance circuit 110, which is about 27.12 MHz.

As described above, when the first frequency is close to two times of the resonance frequency of the resonance circuit 110, the cutoff frequency of the filter 140 at the first transmission electrode TX1 and the cutoff frequency of the filter 140 at the second transmission electrode TX2 may be set close to two times of the resonance frequency of the resonance circuit 110.

Since the frequency of the transmission signal TS is about 13.56 MHz, which corresponds to the resonance frequency of the resonance circuit 110, as illustrated in FIG. 8, a loss occurring while the transmission signal TS is transferred from the first transmission electrode TX1 to the resonance circuit 110 may be only 0.66 dB and a loss occurring while the transmission signal TS is transferred from the second transmission electrode TX2 to the resonance circuit 110 may be only 0.79 dB.

Therefore, an output power of transceiver 100 may effectively increase.

Figure 9:
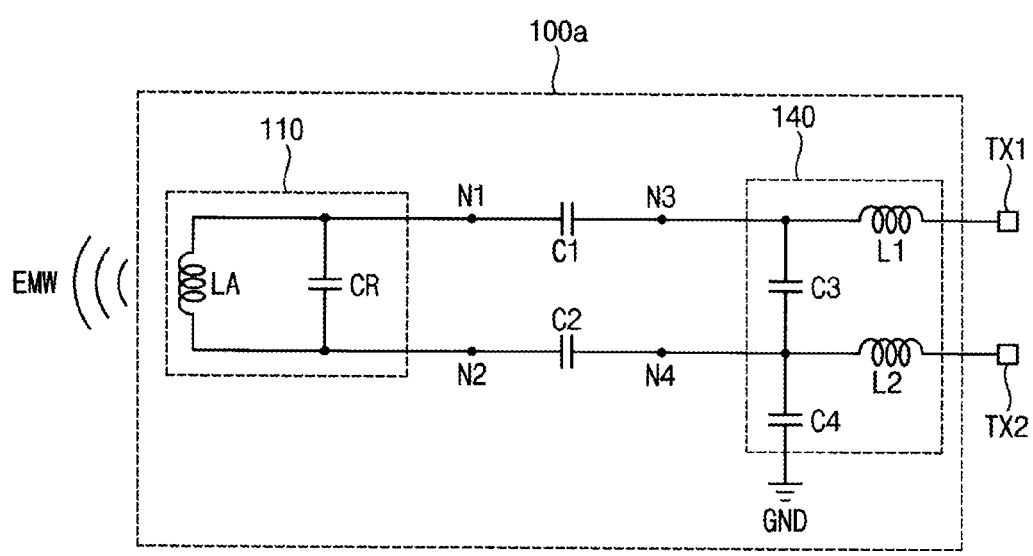
FIG. 9 is a block diagram illustrating an example of an NFC device of FIG. 1.
Figure 9:
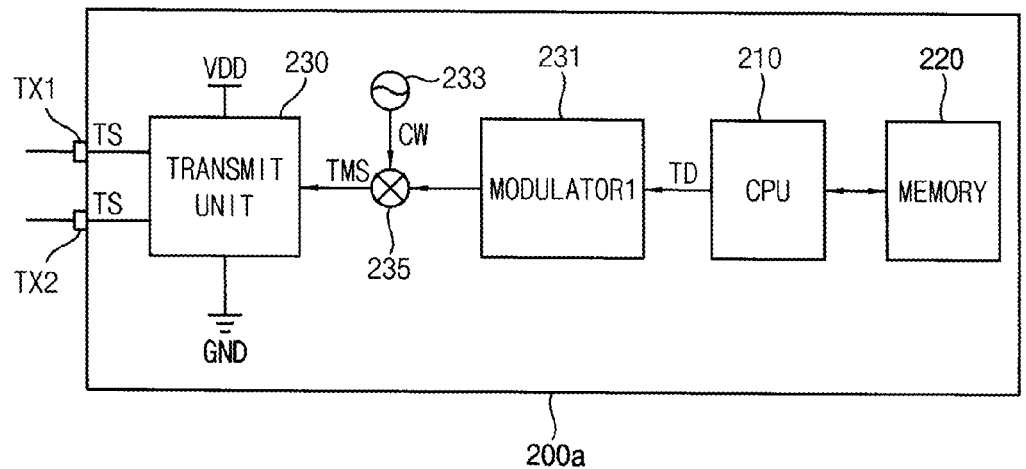

FIG. 9 is a block diagram illustrating an example of an NFC device of FIG. 1.

Referring to FIG. 9, an NFC device 10a may include a transceiver 100a and an NFC chip 200a.

The NFC chip 200a may be coupled to the transceiver 100a through the first transmission electrode TX1 and the second transmission electrode TX2.

The transceiver 100a included in the NFC device 10a of FIG. 9 may be the same as the transceiver 100a of FIG. 3.

The NFC chip 200a may include a central processing unit (CPU) 210, a memory 220, a first modulator 231, an oscillator 233, a mixer 235, and a transmit unit 230.

When the NFC chip 200a performs a transmit operation in the reader mode, the CPU 210 may read out output data TD from the memory 220 to provide the output data TD to the first modulator 231, the first modulator 231 may modulate the output data TD to generate a modulation signal, the oscillator 233 may generate a carrier signal CW having a carrier frequency (e.g., 13.56 MHz), and the mixer 235 may generate a transmission modulation signal TMS by synthesizing the carrier signal CW with the modulation signal.

The transmit unit 230 may be coupled between a supply voltage VDD and the ground voltage GND.

The transmit unit 230 may provide the transmission signal TS, which corresponds to the transmission modulation signal TMS received from the mixer 235, to the transceiver 100a through the first transmission electrode TX1 and the second transmission electrode TX2, and the transceiver 100a may emit the electromagnetic wave EMW based on the transmission signal TS.

In some example embodiments, the transmit unit 230 may provide the transmission signal TS corresponding to the transmission modulation signal TMS to the transceiver 100a through the first transmission electrode TX1 and the second transmission electrode TX2 by connecting the first transmission electrode TX1 and the second transmission electrode TX2 to the supply voltage VDD through a pull-up load, or to the ground voltage GND through a pull-down load based on the transmission modulation signal TMS.

For example, the transmit unit 230 may connect the first transmission electrode TX1 to the supply voltage VDD through the pull-up load and connect the second transmission electrode TX2 to the ground voltage GND through the pull-down load, or connect the first transmission electrode TX1 to the ground voltage GND through the pull-down load and connect the second transmission electrode TX2 to the supply voltage VDD through the pull-up load based on the transmission modulation signal TMS to provide the transmission signal TS corresponding to the transmission modulation signal TMS to the transceiver 100a through the first transmission electrode TX1 and the second transmission electrode TX2.

When the transmit unit 230 connects the first transmission electrode TX1 to the supply voltage VDD through the pull-up load and connects the second transmission electrode TX2 to the ground voltage GND through the pull-down load, an output current may be generated from the supply voltage VDD, be provided to the transceiver 100a through the first transmission electrode TX1, and be sunk to the ground voltage GND through the second transmission electrode TX2.

When the transmit unit 230 connects the first transmission electrode TX1 to the ground voltage GND through the pull-down load and connects the second transmission electrode TX2 to the supply voltage VDD through the pull-up load, the output current may be generated from the supply voltage VDD, be provided to the transceiver 100a through the second transmission electrode TX2, and be sunk to the ground voltage GND through the first transmission electrode TX1.

Figure 10:
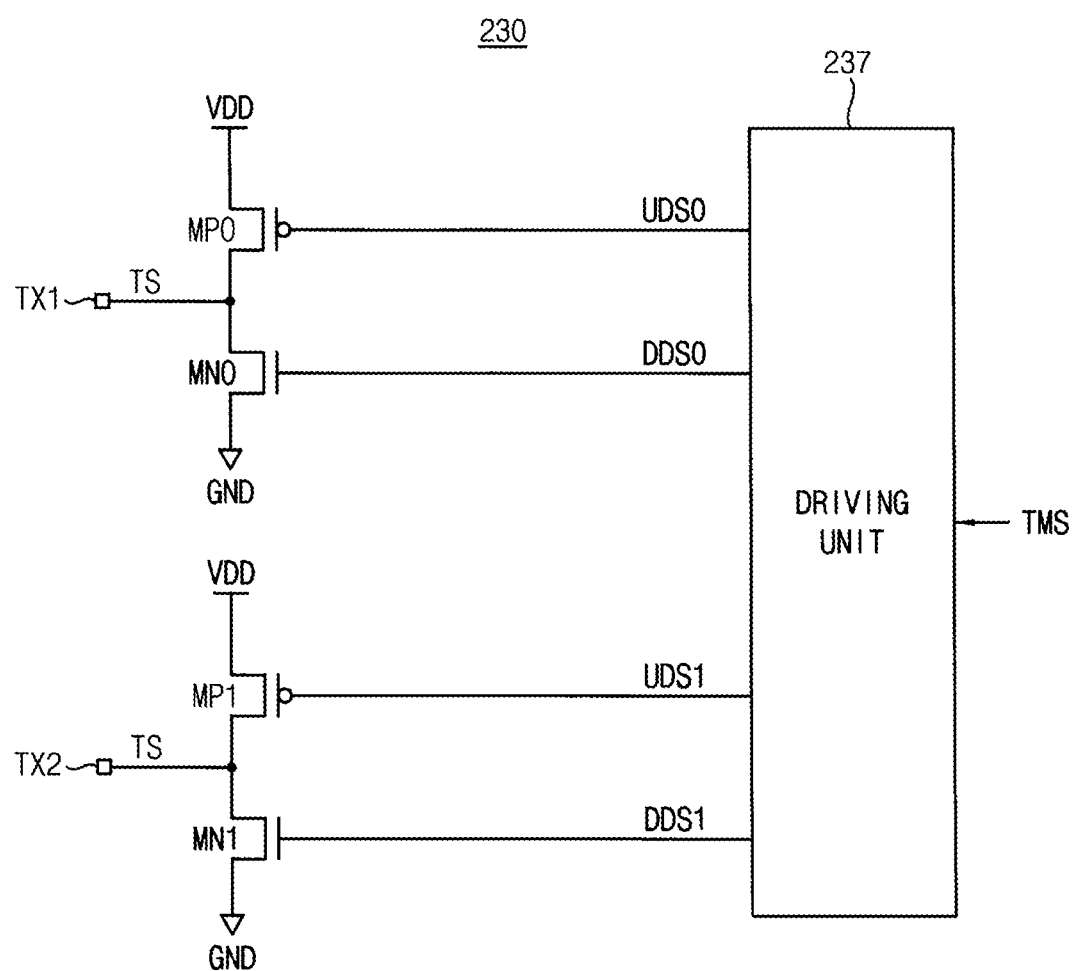
FIG. 10 is a block diagram illustrating an example of a transmit unit included in the NFC device of FIG. 9.

FIG. 10 is a block diagram illustrating an example of a transmit unit included in the NFC device of FIG. 9.

Referring to FIG. 10, the transmit unit 230 may include a first pull-up transistor MP0, a second pull-up transistor MP1, a first pull-down transistor MN0, a second pull-down transistor MN1, and a driving unit 237.

The first pull-up transistor MP0 and the second pull-up transistor MP1 may be p-type metal oxide semiconductor (PMOS) transistors. The first pull-down transistor MN0 and the second pull-down transistor MN1 may be n-type metal oxide semiconductor (NMOS) transistors.

The first pull-up transistor MP0 may be coupled between the supply voltage VDD and the first transmission electrode TX1, and the first pull-down transistor MN0 may be coupled between the first transmission electrode TX1 and the ground voltage GND.

The second pull-up transistor MP1 may be coupled between the supply voltage VDD and the second transmission electrode TX2, and the second pull-down transistor MN1 may be coupled between the second transmission electrode TX2 and the ground voltage GND.

The driving unit 237 may drive the first pull-up transistor MP0 using a first pull-up driving signal UDS0, drive the first pull-down transistor MN0 using a first pull-down driving signal DDS0, drive the second pull-up transistor MP1 using a second pull-up driving signal UDS1, and drive the second pull-down transistor MN1 using a second pull-down driving signal DDS1.

The driving unit 237 may turn on one of the first pull-up transistor MP0 and the first pull-down transistor MN0 and turn on one of the second pull-up transistor MP1 and the second pull-down transistor MN1 based on the transmission modulation signal TMS received from the mixer 235.

For example, the driving unit 237 may turn on the first pull-up transistor MP0 and the second pull-down transistor MN1 and turn off the second pull-up transistor MP1 and the first pull-down transistor MN0, or turn on the second pull-up transistor MP1 and the first pull-down transistor MN0 and turn off the first pull-up transistor MP0 and the second pull-down transistor MN1 based on the transmission modulation signal TMS.

Figure 11:
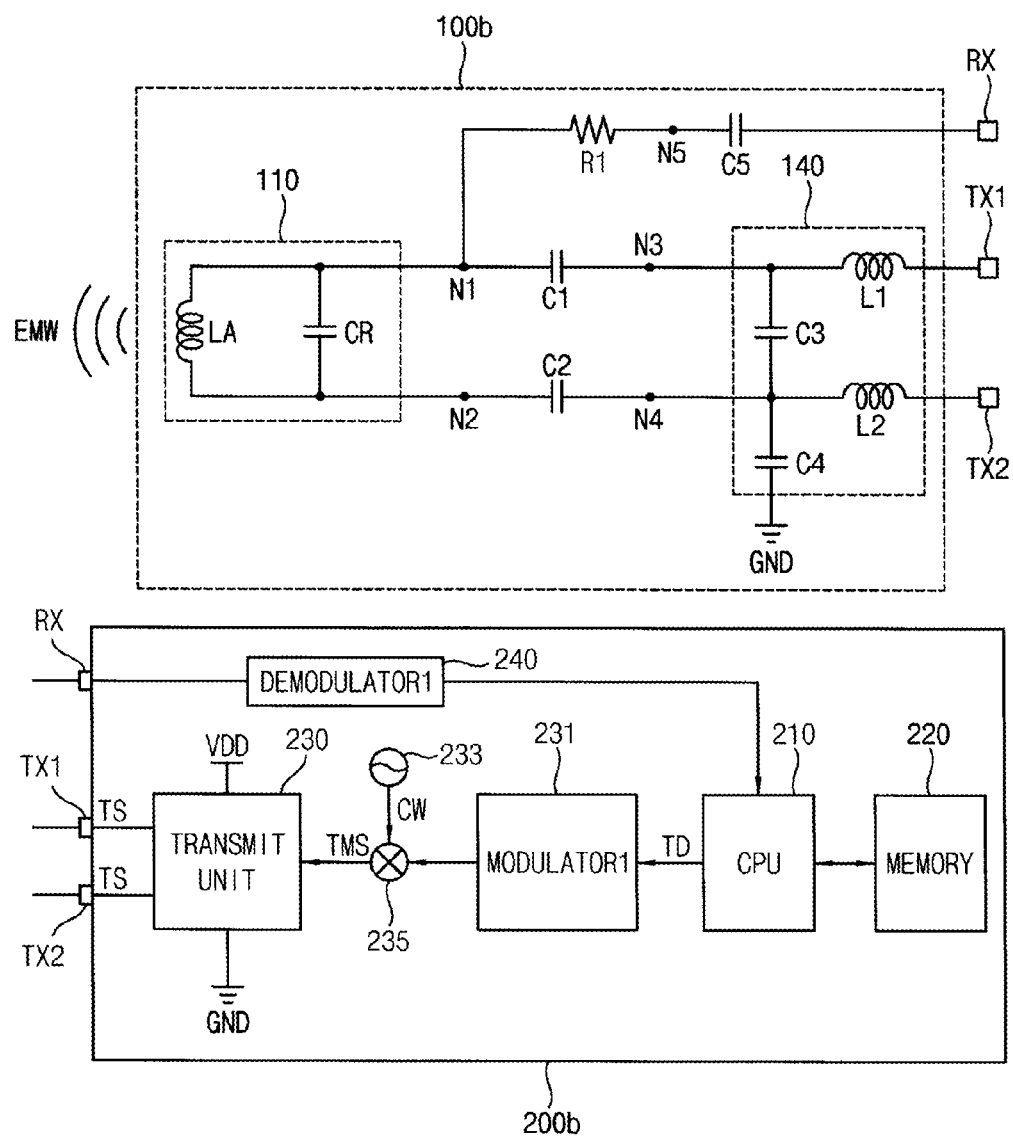
FIG. 11 is a block diagram illustrating an example of an NFC device of FIG. 1.

FIG. 11 is a block diagram illustrating an example of an NFC device of FIG. 1.

Referring to FIG. 11, an NFC device 10b may include a transceiver 100b and an NFC chip 200b.

The NFC chip 200b may be coupled to the transceiver 100b through the first transmission electrode TX1, the second transmission electrode TX2, and a reception electrode RX.

The transceiver 100b included in the NFC device 10b of FIG. 11 may further include a first resistor R1 and a fifth capacitor C5 from the transceiver 100a of FIG. 3.

The first resistor R1 may be coupled between the first node N1 and a fifth node N5. The fifth capacitor C5 may be coupled between the fifth node N5 and the reception electrode RX.

The NFC chip 200b included in the NFC device 10b of FIG. 11 may further include a first demodulator 240 from the NFC chip 200a of FIG. 9.

As described above, in the reader mode, the transceiver 100b may emit the electromagnetic wave EMW to communicate data with an external NFC card. Since the external NFC card includes a resonance circuit that includes an antenna having an inductance component and a resonance capacitor, a mutual induction may occur between the antenna LA included in the resonance circuit 110 of the transceiver 100b and the external NFC card, which is located near the NFC device 10b, while the transceiver 100b emits the electromagnetic wave EMW. Therefore, an antenna voltage may be generated between the first node N1 and the second node N2, which correspond to two ends of the antenna LA, through the mutual induction with the external NFC card.

Since the antenna voltage is generated in the reader mode based on the electromagnetic wave EMW emitted by the transceiver 100b, a magnitude of the antenna voltage may be relatively high. The magnitude of the antenna voltage may decrease while passing through the first resistor R1 and the fifth capacitor C5, such that the antennal voltage may be provided to the NFC chip 200b as a reception signal through the reception electrode RX.

When the NFC chip 200b performs a receive operation in the reader mode, the first demodulator 240 may generate input data by demodulating the reception signal provided by the transceiver 100b through the reception electrode RX to provide the input data to the CPU 210. The CPU 210 may store the input data in the memory 220.

Figure 12:
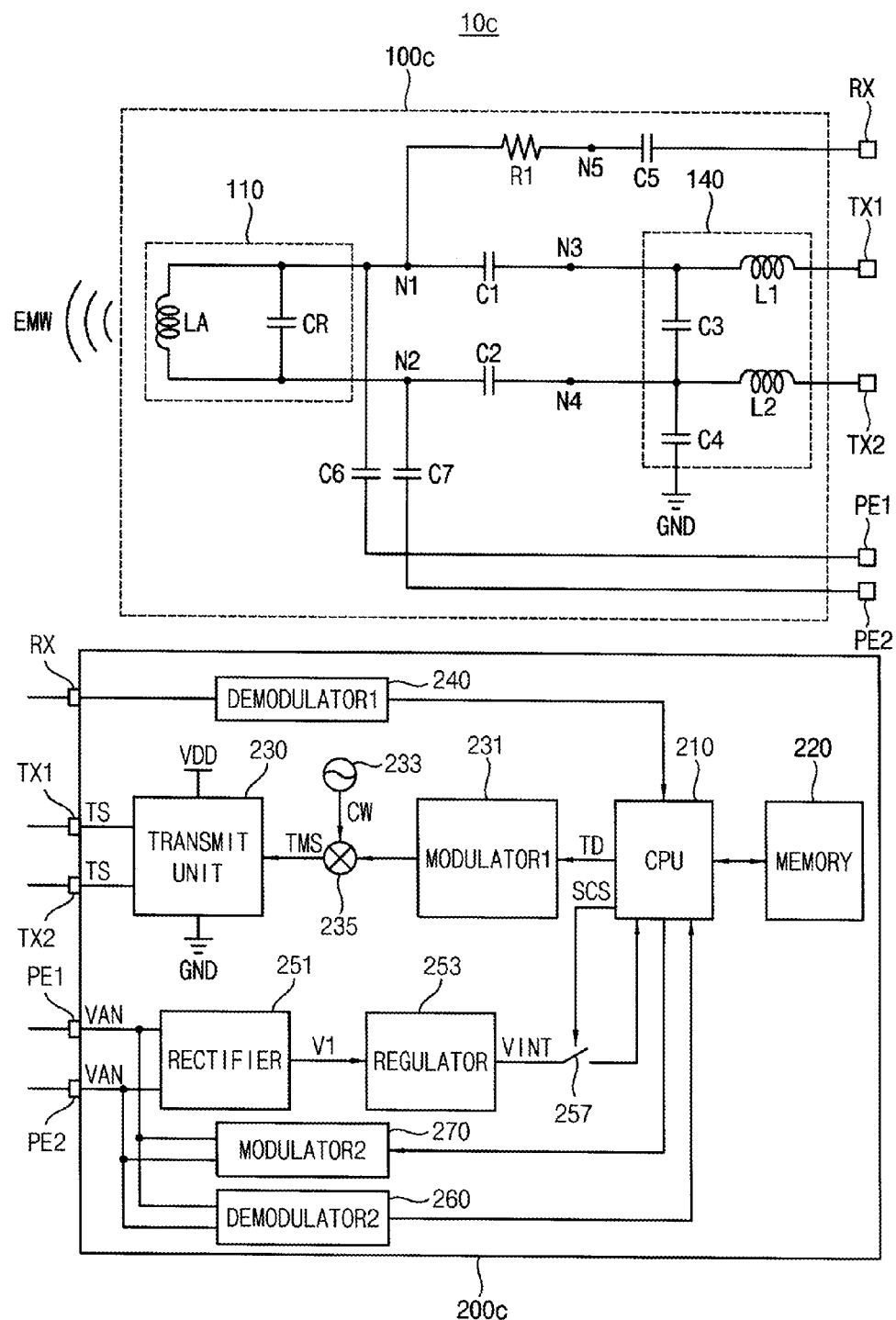
FIG. 12 is a block diagram illustrating an example of an NFC device of FIGS. 1.

FIG. 12 is a block diagram illustrating an example of an NFC device of FIG. 1.

Referring to FIG. 12, an NFC device 10c may include a transceiver 100c and an NFC chip 200c.

The NFC chip 200c may be coupled to the transceiver 100c through the first transmission electrode TX1, the second transmission electrode TX2, a reception electrode RX, a first power electrode PE1, and a second power electrode PE2.

The transceiver 100c included in the NFC device 10c of FIG. 12 may further include a sixth capacitor C6 and a seventh capacitor C7 from the transceiver 100b of FIG. 11.

The sixth capacitor C6 may be coupled between the first node N1 and the first power electrode PE1. The seventh capacitor C7 may be coupled between the second node N2 and the second power electrode PE2.

The NFC chip 200c included in the NFC device 10c of FIG. 12 may further include a rectifier 251, a regulator 253, a power switch 257, a second demodulator 260, and a second modulator 270 from the NFC chip 200b of FIG. 11.

As described above, in the card mode, the transceiver 100c may communicate data with an external NFC reader using the electromagnetic wave EMW emitted by the external NFC reader. That is, a mutual induction may occur between the antenna LA included in the resonance circuit 110 of the transceiver 100c and the external NFC reader based on the electromagnetic wave EMW emitted by the external NFC reader. Therefore, an antenna voltage VAN may be generated between the first node N1 and the second node N2, which correspond to two ends of the antenna LA, through the mutual induction with the external NFC reader.

The antenna voltage VAN may be transferred to the first power electrode PE1 and the second power electrode PE2 through the sixth capacitor C6 and the seventh capacitor C7, respectively.

The rectifier 251 may generate a first voltage V1, which is a direct voltage, by rectifying the antenna voltage VAN provided by the transceiver 100c through the first power electrode PE1 and the second power electrode PE2.

The regulator 253 may generate an internal voltage VINT, which has a voltage level of a desired magnitude (that may or may not be predetermined) usable in the NFC chip 200c, using the first voltage V1.

The CPU 210 may control the overall operation of the NFC chip 200c. The CPU 210 may operate using the supply voltage VDD provided by a power source, such as a battery. In addition, the CPU 210 may receive the internal voltage VINT from the regulator 253 through the power switch 257. When the supply voltage VDD is equal to or higher than a desired voltage level (that may or may not be predetermined), the CPU 210 may operate using the supply voltage VDD and disable a switch control signal SCS to turn off the power switch 257. When the supply voltage VDD is lower than the desired voltage level (that may or may not be predetermined), the CPU 210 may enable the switch control signal SCS to turn on the power switch 257 such that the CPU 210 may operate using the internal voltage VINT provided by the regulator 253.

When the NFC chip 200c performs the receive operation in the card mode, the second demodulator 260 may generate input data by demodulating a signal provided by the transceiver 100c through the first power electrode PE1 and the second power electrode PE2 to provide the input data to the CPU 210. The CPU 210 may store the input data in the memory 220.

When the NFC chip 200c performs the transmit operation in the card mode, the CPU 210 may read out output data from the memory 220 to provide the output data to the second modulator 270, and the second modulator 270 may modulate the output data to provide a modulation signal to the transceiver 100c through the first power electrode PE1 and the second power electrode PE2. For instance, the second modulator 270 may generate the modulation signal by performing a load modulation on the output data. The transceiver 100c may transmit the output data to the external NFC reader by causing the mutual induction with the external NFC reader based on the modulation signal.

Figure 13:
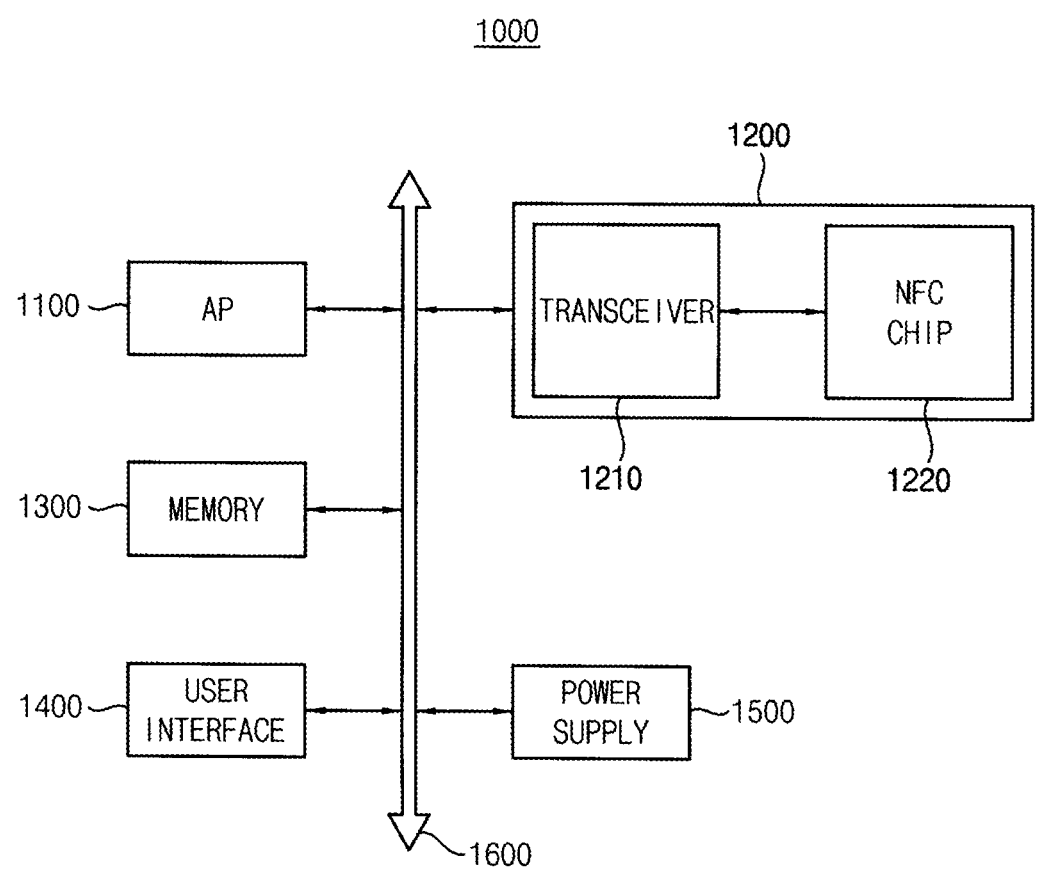
FIG. 13 is a block diagram illustrating an electronic system according to some example embodiments.

FIG. 13 is a block diagram illustrating an electronic system according to some example embodiments.

Referring to FIG. 13, an electronic system 1000 includes an application processor (AP) 1100, an NFC device 1200, a memory device 1300, a user interface 1400, a power supply 1500, and a bus 1600. In some example embodiments, the electronic system 1000 may be arbitrary mobile systems, such as a mobile phone, a smart phone, a personal digital assistant (PDA), a portable multimedia player (PMP), a digital camera, a camcorder, a music player, a portable game console, a navigation system, etc.

The application processor 1100 controls overall operations of the electronic system 1000. The application processor 1100 may execute applications, such as a web browser, a game application, a video player, etc. In some example embodiments, the application processor 1100 may include a single core or multiple cores. For example, the application processor 1100 may be a multi-core processor, such as a dual-core processor, a quad-core processor, a hexa-core processor, etc. The application processor 1100 may include an internal or external cache memory.

The memory device 1300 stores various data. For example, the memory device 1300 may store output data to be transmitted to an external device and input data received from the external device. In some example embodiments, the memory device 1300 may be an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), etc.

The NFC device 1200 transmits the output data stored in the memory device 1300 to the external device through NFC. The NFC device 1200 receives the input data from the external device through NFC and stores the input data in the memory device 1300.

The NFC device 1200 includes a transceiver 1210 and an NFC chip 1220. The NFC chip 1220 generates a transmission signal corresponding to the output data and outputs the transmission signal through a first transmission electrode and a second transmission electrode. The transceiver 1210 transmits the output data to the external device by emitting an electromagnetic wave based on the transmission signal. The transceiver 1210 is coupled between the first transmission electrode and the second transmission electrode in an asymmetrical structure, such that the transceiver 1210 provides a first frequency response to the first transmission electrode and provides a second frequency response, which is different from the first frequency response, to the second transmission electrode.

The NFC device 1200 may be implemented with the NFC device 10 of FIG. 1.

The user interface 1400 may include at least one input device, such as a keypad, a touch screen, etc., and at least one output device, such as a speaker, a display device, etc. The power supply 1500 may supply a power supply voltage to the electronic system 1000.

In some example embodiments, various portions of the electronic system 1000 may communicate via bus 1600. For example, the application processor (AP) 1100, the NFC device 1200, the memory device 1300, the user interface 1400, and/or the power supply 1500 may communicate with each other via bus 1600.

In some example embodiments, the electronic system 1000 may further include an image processor, and/or a storage device, such as a memory card, a solid state drive (SSD), a hard disk drive (HDD), a CD-ROM, etc.

In some example embodiments, the electronic system 1000 and/or components of the electronic system 1000 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline integrated circuit (SOIC), shrink small outline package (SSOP), thin small outline package (TSOP), system in package (SIP), multi-chip package (MCP), wafer-level fabricated package (WFP), or wafer-level processed stack package (WSP).

The foregoing is illustrative of some example embodiments of the present inventive concepts and is not to be construed as limiting thereof. Although some example embodiments have been described, those skilled in the art will readily appreciate that many modifications are possible in the example embodiments without materially departing from the novel teachings and advantages of the present inventive concepts. Accordingly, all such modifications are intended to be included within the scope of the present inventive concepts as defined in the claims.

It should be understood that the example embodiments described herein should be considered in a descriptive sense only and not for purposes of limitation. Descriptions of features or aspects within each embodiment should typically be considered as available for other similar features or aspects in other embodiments.

What is claimed is:

1. A transceiver for near field communication (NFC), the transceiver comprising:
a resonance circuit coupled between a first node and a second node, the resonance circuit having a resonance frequency and being configured to emit an electromagnetic wave to communicate data with an external device;
a first capacitor coupled between the first node and a third node;
a second capacitor coupled between the second node and a fourth node; and
a filter comprising a first terminal coupled to the third node, a second terminal coupled to the fourth node, a third terminal a coupled to a first transmission electrode, and a fourth terminal coupled to a second transmission electrode in an asymmetrical structure to provide a first frequency response and a second frequency response to the first transmission electrode and the second transmission electrode, respectively, the first frequency response being different from the second frequency response, the filter being configured to receive the data through the first transmission electrode and the second transmission electrode;
wherein the filter further comprises:
a first inductor coupled between the third node and the first transmission electrode or between the third node and a ground; and
a second inductor coupled between the fourth node and the second transmission electrode or between the fourth node and the ground;

wherein an inductance of the first inductor is greater than an inductance of the second inductor.

2. The transceiver of claim 1, wherein a cutoff frequency of the filter at the first transmission electrode and a cutoff frequency of the filter at the second transmission electrode correspond to two times the resonance frequency.

3. The transceiver of claim 1, wherein a reactance between the first transmission electrode and the second transmission electrode is zero ohms.

4. The transceiver of claim 1, wherein the filter is configured to perform a low-pass filtering operation.

5. The transceiver of claim 1, wherein the filter comprises at least one capacitor and at least one inductor.

6. The transceiver of claim 1, wherein the filter comprises:
a third capacitor coupled between the third node and the fourth node; and
a fourth capacitor coupled between the fourth node and a ground voltage.

7. The transceiver of claim 6, wherein the filter further comprises:
a first inductor coupled between the third node and the first transmission electrode; and
a second inductor coupled between the fourth node and the second transmission electrode.

8. The transceiver of claim 1, wherein a capacitance of the first capacitor is substantially the same as a capacitance of the second capacitor.

9. The transceiver of claim 1, wherein the resonance circuit comprises:
an antenna coupled between the first node and the second node; and
a resonance capacitor coupled between the first node and the second node.

10. A transceiver for near field communication (NFC), the transceiver comprising:
a resonance circuit coupled between a first node and a second node, the resonance circuit having a resonance frequency and being configured to emit an electromagnetic wave to communicate data with an external device;
a first capacitor coupled between the first node and a third node;
a second capacitor coupled between the second node and a fourth node; and
a filter comprising a first terminal coupled to the third node, a second terminal coupled to the fourth node, a third terminal coupled to a first transmission electrode, and a fourth terminal coupled to a second transmission electrode in an asymmetrical structure to provide a first frequency response and a second frequency response to the first transmission electrode and the second transmission electrode, respectively, the first frequency response being different from the second frequency response, the filter being configured to receive the data through the first transmission electrode and the second transmission electrode, wherein
a cutoff frequency of the filter at the first transmission electrode and a cutoff frequency of the filter at the second transmission electrode are greater than one and a half times the resonance frequency and less than two times the resonance frequency.

11. A transceiver for near field communication (NFC), the transceiver comprising:
a resonance circuit coupled between a first node and a second node, the resonance circuit having a resonance frequency and being configured to emit an electromagnetic wave the communicate data with an external device;
a first capacitor coupled between the first node and a third node;
a second capacitor coupled between the second node and a fourth node; and
a filter coupled among a first transmission electrode, a second transmission electrode, the third node, and the fourth node in an asymmetrical structure to provide a first frequency response and a second frequency response to the first transmission electrode and the second transmission electrode, respectively, the first frequency response being different from the second frequency response, the filter being configured to receive the data through the first transmission electrode and the second transmission electrode;
wherein the filter further comprises:
a first inductor coupled between the third node and the first transmission electrode; and
a second inductor coupled between the fourth node and the second transmission electrode;
wherein an inductance of the first inductor is greater than an inductance of the second inductor.

12. The transceiver of claim 11, wherein an inductance of the first inductor is greater than two times an inductance of the second inductor.

13. The transceiver of claim 11, wherein a cutoff frequency of the filter at the first transmission electrode is determined based on a capacitance of the fourth capacitor and an inductance of the second inductor.

14. The transceiver of claim 11, wherein a reactance between the first transmission electrode and the second transmission electrode is determined based on a capacitance of the third capacitor, an inductance of the first inductor, and an inductance of the second inductor.

15. A transceiver for near field communication (NFC), the transceiver comprising:
a first capacitor;
a second capacitor;
a first transmission electrode;
a second transmission electrode;
a circuit, configured to emit an electromagnetic wave to communicate data to an external device, electrically connected to a first terminal of the first capacitor and a first terminal of the second capacitor; and
a filter comprising a first terminal electrically connected to a second terminal of the first capacitor, a second terminal electrically connected to a second terminal of the second capacitor, a third terminal electrically connected to a first transmission electrode, and a fourth terminal electrically connected to the second transmission electrode in an asymmetrical structure to provide a first frequency response to the first transmission electrode and a second frequency response to the second transmission electrode;
wherein the filter further comprises:
a first inductor electrically connected between the third node and the first transmission electrode or between the third node and a ground; and
a second inductor electrically connected between the fourth node and the second transmission electrode or between the fourth node and the ground;
wherein an inductance of the first inductor is greater than an inductance of the second inductor;
wherein the first frequency response is different from the second frequency response, and wherein the filter is configured to receive the data through the first and second transmission electrodes.

16. The transceiver of claim 15, wherein the filter is configured to perform a low-pass filtering operation.

17. The transceiver of claim 15, wherein the filter comprises:
a third capacitor;
wherein a first terminal of the third capacitor is electrically connected to the second terminal of the first capacitor, and
wherein a second terminal of the third capacitor is electrically connected to the second terminal of the second capacitor.

18. The transceiver of claim 17, wherein the filter further comprises:
a fourth capacitor;
wherein a first terminal of the fourth capacitor is electrically connected to the second terminal of the second capacitor and the second terminal of the third capacitor, and
wherein a second terminal of the fourth capacitor is electrically connected to a ground voltage.

19. The transceiver of claim 15, wherein the filter comprises:
a third capacitor;
wherein a first terminal of the third capacitor is electrically connected to the first transmission electrode, and
wherein a second terminal of the third capacitor is electrically connected to the second transmission electrode.

20. The transceiver of claim 19, wherein the filter further comprises:
a fourth capacitor;
wherein a first terminal of the fourth capacitor is electrically connected to the second terminal of the third capacitor and the second transmission electrode, and
wherein a second terminal of the fourth capacitor is electrically connected to a ground voltage.

* * * * *